(12) United States Patent
Ho et al.

(10) Patent No.: US 11,599,203 B2
(45) Date of Patent: Mar. 7, 2023

(54) BACKLIGHT MODULE

(71) Applicant: Chicony Power Technology Co., Ltd., New Taipei (TW)

(72) Inventors: Hsuan-Wei Ho, New Taipei (TW); Tsung-Hsun Chen, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/448,897

(22) Filed: Sep. 27, 2021

(65) Prior Publication Data
US 2023/0021798 A1    Jan. 26, 2023

(30) Foreign Application Priority Data

Jul. 23, 2021 (TW) ................................ 110127084

(51) Int. Cl.
*H01H 13/83* (2006.01)
*G06F 3/02* (2006.01)
*F21V 8/00* (2006.01)

(52) U.S. Cl.
CPC ........... *G06F 3/021* (2013.01); *G02B 6/0083* (2013.01); *G02B 6/0088* (2013.01); *H01H 13/83* (2013.01)

(58) Field of Classification Search
CPC ..... G06F 3/021; G02B 6/0083; G02B 6/0088; H01H 13/83
See application file for complete search history.

(56) References Cited

U.S. PATENT DOCUMENTS

| 6,442,043 B1 * | 8/2002 | Seki | H01L 21/563 257/E23.101 |
| 8,987,617 B2 | 3/2015 | Wang et al. | |
| 10,824,009 B2 | 11/2020 | Chen et al. | |
| 2013/0235611 A1 * | 9/2013 | Franklin | G09F 13/04 362/616 |
| 2015/0027754 A1 * | 1/2015 | Shimoda | C08G 73/1053 524/588 |
| 2015/0109757 A1 * | 4/2015 | Chen | H01H 3/125 362/23.03 |

FOREIGN PATENT DOCUMENTS

| CN | 203910618 U | * 10/2014 |
| CN | 205491423 U | * 8/2016 |

(Continued)

*Primary Examiner* — Temesghen Ghebretinsae
*Assistant Examiner* — Karin Kiyabu
(74) *Attorney, Agent, or Firm* — CKC & Partners Co., LLC

(57) ABSTRACT

A backlight module includes a flexible circuit board and a light guide plate. A first light source assembly, a second light source assembly, and a positioning member are disposed on the flexible circuit board. The light guide plate is disposed over the flexible circuit board and includes a first single key light guide area, a second single key light guide area, and a connection area. The first single key light guide area has a first through hole accommodating the first light source assembly. The second single key light guide area has a second through hole accommodating the second light source assembly. The connection area is located between the first and second single key light guide areas and has an accommodating hole. The flexible circuit board is overlapped with the light guide plate with the positioning member being accommodated in the accommodating hole.

9 Claims, 5 Drawing Sheets

(56) References Cited

FOREIGN PATENT DOCUMENTS

| TW | 201007801 A | | 2/2010 |
|---|---|---|---|
| TW | 201703087 A | | 1/2017 |
| TW | I597752 B | | 9/2017 |
| TW | I614784 B | | 2/2018 |
| TW | I628686 B | | 7/2018 |
| TW | I661452 B | | 6/2019 |
| TW | I699808 B | | 7/2020 |
| TW | 202111748 A | | 3/2021 |
| TW | M613965 U | * | 7/2021 |

* cited by examiner

BACKLIGHT MODULE

CROSS-REFERENCE TO RELATED APPLICATION

This application claims priority to Taiwan Application Serial Number 110127084, filed Jul. 23, 2021, which is herein incorporated by reference.

BACKGROUND

Technical Field

The present disclosure relates to a keyboard device, and more particularly, to a backlight module used in a keyboard device.

Description of Related Art

The appearances of traditional keyboards are usually monotonous and dull, so computer peripheral manufacturers have developed light-emitting keyboards with excellent visual effects. The light-emitting keyboards have backlight modules. In conventional backlight modules, the circuit boards used in the backlight modules can be mainly classified into two types, in which one type is a rigid circuit board and the other type is a flexible circuit board.

Although the design of the backlight module using the rigid circuit board is simple, its thickness may not meet the market demand due to the thinning trend of the backlight module. Although the backlight module using the flexible circuit board is conducive to thinning, when the flexible circuit board uses Surface Mount Technology (SMT) for double-sided mounting, the problem of instability will occur and the yield will be affected.

Accordingly, how to provide a backlight module to solve the aforementioned problems becomes an important issue to be solved by those in the industry.

SUMMARY

An aspect of the disclosure is to provide a backlight module that may efficiently solve the aforementioned problems.

According to an embodiment of the disclosure, a backlight module includes a flexible circuit board and a light guide plate. A first light source assembly, a second light source assembly, and a positioning member are disposed on the flexible circuit board. The light guide plate is disposed over the flexible circuit board and includes a first single key light guide area, a second single key light guide area, and a connection area. The first single key light guide area has a first through hole accommodating the first light source assembly. The second single key light guide area has a second through hole accommodating the second light source assembly. The connection area is located between the first light source assembly and the second light source assembly and has an accommodating hole. The flexible circuit board is overlapped with the light guide plate with the positioning member being accommodated in the accommodating hole.

In an embodiment of the disclosure, the positioning member is arranged between the first light source assembly and the second light source assembly in a direction.

In an embodiment of the disclosure, the backlight module further includes a light-shielding plate. The light-shielding plate is disposed over the light guide plate. The connection area includes a microstructure portion. The microstructure portion is located between one of the first light source assembly and the second light source assembly and the positioning member, so as to guide light emitted by the one of the first light source assembly and the second light source assembly to a shielding area of the light-shielding plate.

In an embodiment of the disclosure, the backlight module further includes a reflective layer. The reflective layer is disposed between the light guide plate and the flexible circuit board. The positioning member penetrates the reflective layer and is accommodated in the accommodating hole.

In an embodiment of the disclosure, the flexible circuit board has a first surface facing toward the light guide plate and includes a first circuit. The first circuit is disposed on the first surface and connected with the first light source assembly and the second light source assembly.

In an embodiment of the disclosure, the flexible circuit board has a second surface facing away from the light guide plate and further includes a second circuit and a control element. The second circuit is disposed on the second surface and electrically connected to the first circuit. The control element is disposed on the second surface and connected to the second circuit.

In an embodiment of the disclosure, the positioning member is disposed on the first surface and aligned with the control element in a direction perpendicular to the first surface or the second surface.

In an embodiment of the disclosure, a thickness of the positioning member is greater than a thickness of the light guide plate and is substantially equal to or smaller than a thickness sum of the light guide plate and the first circuit.

In an embodiment of the disclosure, the backlight module further includes a reflective layer. The reflective layer is disposed between the light guide plate and the first circuit. A thickness of the positioning member is greater than a thickness of the light guide plate and is substantially equal to or smaller than a thickness sum of the light guide plate, the reflective layer, and the first circuit.

In an embodiment of the disclosure, a hardness of the positioning member is greater than a hardness of the flexible circuit board.

Accordingly, in the backlight module of the present disclosure, by disposing the positioning member on the flexible circuit board and forming the accommodating hole on the light guide plate to accommodate the positioning member, the convenience of assembling the backlight module is increased. In addition, the positioning member increases the structural stability of the flexible circuit board, thereby increasing the yield of double-sided mounting using surface mount technology (SMT). By arranging the positioning member between the first light source assembly and the second light source assembly in one direction, the light isolation effect may be achieved between the first light source assembly and the second light source assembly. By making the positioning member penetrate the reflective layer disposed between the light guide plate and the flexible circuit board, the thickness of the positioning member may be increased, so as to increase the strength of the positioning member and further increase the structural stability of the flexible circuit board. By disposing the positioning member on a region of the first surface of the flexible circuit board that does not overlap the first circuit, the thickness of the positioning member may be further increased. By making the hardness of the positioning member greater than the hardness of the flexible circuit board, the structural stability of the flexible circuit board may be increased.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
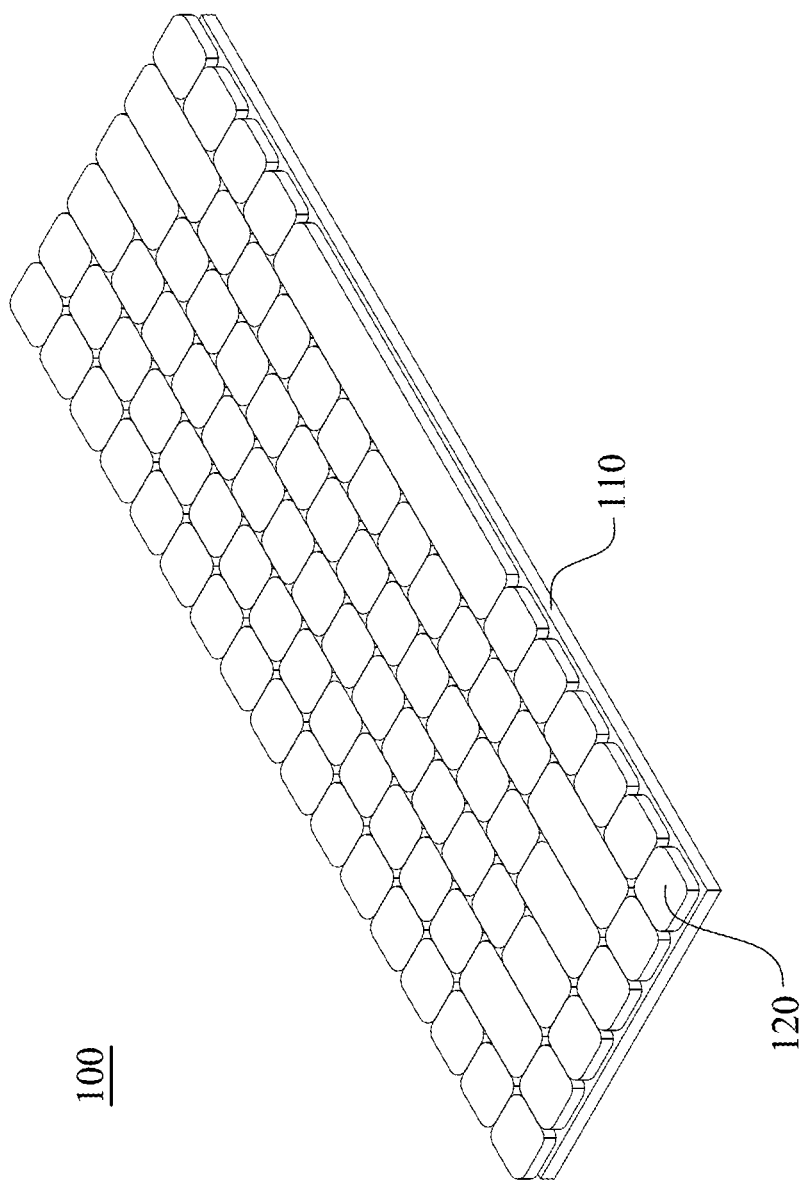
FIG. 1 is a perspective view of a keyboard device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of a keyboard device 100 according to an embodiment of the disclosure. As shown in FIG. 1, in the present embodiment, the keyboard device 100 includes a bottom plate 110, a plurality of keyswitch assemblies 120, and a backlight module 200 (marked in FIG. 2). The keyswitch assemblies 120 are disposed over the bottom plate 110 and configured for the user to press. The backlight module 200 is disposed between the bottom plate 110 and the keyswitch assemblies 120, and is configured to emit light toward the keyswitch assemblies 120, so that the keyboard device 100 becomes a light-emitting keyboard. In addition, the keyboard device 100 of the disclosure may be an external keyboard (e.g., a keyboard with a PS/2 interface or a keyboard with a USB interface) used in a desktop computer, or may be a part of a computer system having an input device (e.g., a touch pad on a notebook computer) that is in the form of a keyswitch, but the disclosure is not limited in this regard. That is, concepts of the keyboard device 100 of the disclosure may be used in any electronic product that performs input function by pressing.

Figure 2:
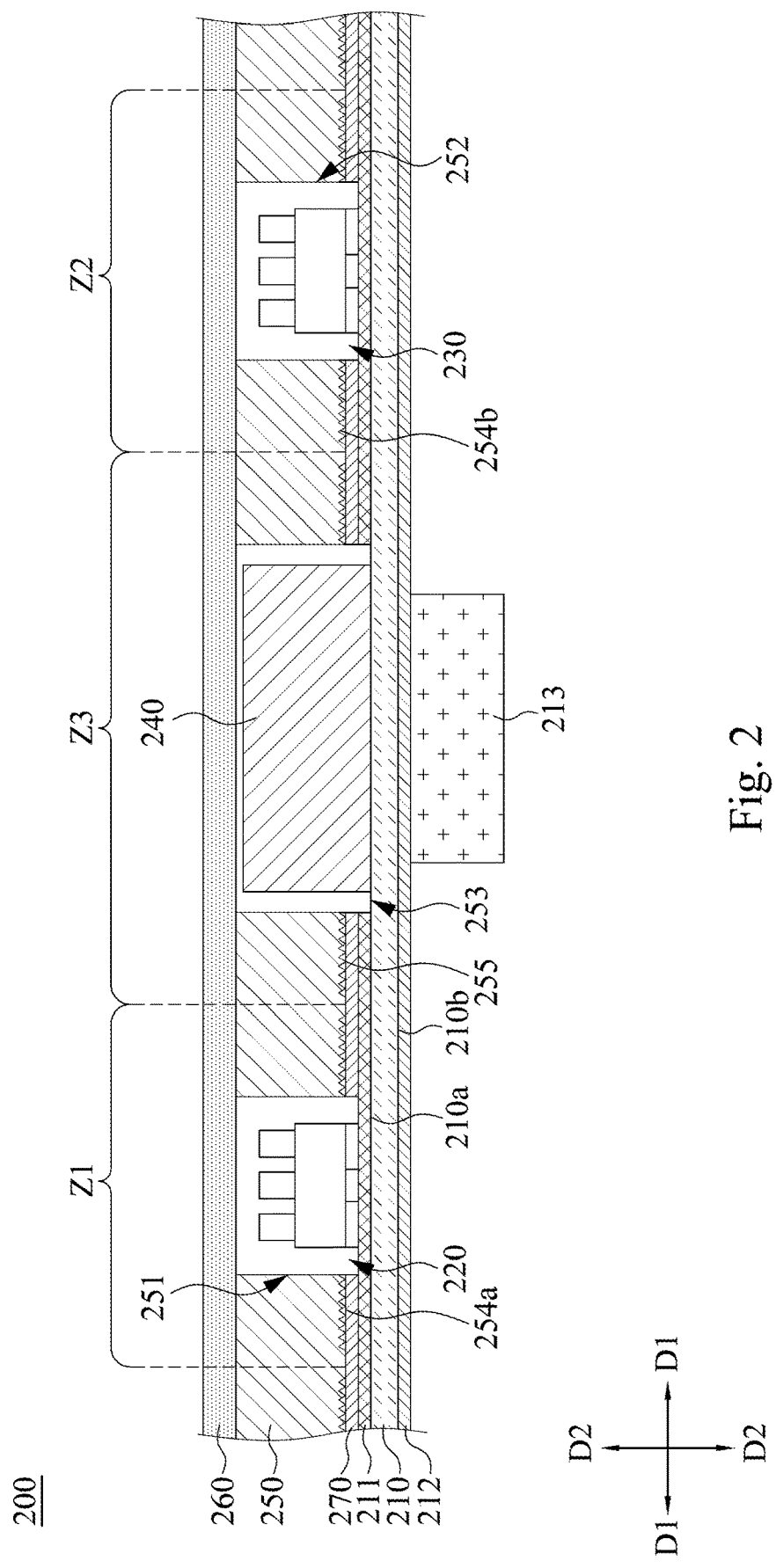
FIG. 2 is a cross-sectional view of a backlight module according to an embodiment of the disclosure.

Reference is made to FIG. 2. FIG. 2 is a cross-sectional view of a backlight module 200 according to an embodiment of the disclosure. As shown in FIG. 2, in the present embodiment, the backlight module 200 includes a flexible circuit board 210. A first light source assembly 220, a second light source assembly 230, and a positioning member 240 are disposed on the flexible circuit board 210. Each of the first light source assembly 220 and the second light source assembly 230 includes a plurality of light-emitting elements (e.g., a red light-emitting element, a green light-emitting element, and a blue light-emitting element), but the disclosure is not limited in this regard. In some other embodiments, at least one of the first light source assembly 220 and the second light source assembly 230 may include only a single light-emitting element. The light-emitting element described here may be, but is not limited to, a light-emitting diode (LED). The flexible circuit board 210 includes a first surface 210a and a second surface 210b opposite to each other. The first light source assembly 220, the second light source assembly 230, and the positioning member 240 are disposed on the first surface 210a of the flexible circuit board 210, and the positioning member 240 is disposed between the first light source assembly 220 and the second light source assembly 230.

By disposing the positioning member 240 on the flexible circuit board 210, not only the assembly may be facilitated, but also the structural stability of the flexible circuit board 210 may be increased, which will be described in detail in subsequent paragraphs.

As shown in FIG. 2, in the present embodiment, the backlight module 200 further includes a light guide plate 250. The light guide plate 250 is disposed over the flexible circuit board 210 and includes a first single key light guide area Z1, a second single key light guide area Z2, and a connection area Z3. The first single key light guide area Z1 and the second single key light guide area Z2 respectively correspond to adjacent two of the keyswitch assemblies 120. For example, the first single key light guide area Z1 and the second single key light guide area Z2 are respectively defined by the orthographic projections of the adjacent two of the keyswitch assemblies 120 on the light guide plate 250 (e.g., the orthographic projections of the keycaps on the light guide plate 250). The connection area Z3 is located between the first single key light guide area Z1 and the second single key light guide area Z2. For example, the connection area Z3 is at least the area of the light guide plate 250 that is connected between the first single key light guide area Z1 and the second single key light guide area Z2. Here is only an example to illustrate two single key light guide areas, but the number of single key light guide areas is not limited thereto. The first single key light guide area Z1 and the second single key light guide area Z2 may be two adjacent ones of the plurality of single key light guide areas.

As shown in FIG. 2, in the present embodiment, the first single key light guide area Z1 has a first through hole 251, and the first light source assembly 220 is accommodated in the first through hole 251. The second single key light guide area Z2 has a second through hole 252, and the second light source assembly 230 is accommodated in the second through hole 252. The connection area Z3 has an accommodating hole 253. The flexible circuit board 210 is overlapped (or stacked) with the light guide plate 250 with the positioning member 240 being accommodated in the accommodating hole 253. With the structural configuration, the flexible circuit board 210 and the light guide plate 250 is quickly aligned during assembly, thereby increasing the convenience of assembling the backlight module 200. Moreover, since the positioning member 240 is disposed in the connection area Z3, the area required by the backlight module 200 will not be increased. In addition, since the positioning member 240 penetrates the light guide plate 250, the overall thickness of the backlight module 200 is not increased. In the present embodiment, the flexible circuit board 210 is provided with one positioning member 240. However, in alternative embodiments, the flexible circuit board 210 may be provided with a plurality of positioning members 240, and any one of the positioning members 240 may be disposed between two adjacent ones of the plurality of single key light guide areas.

As shown in FIG. 2, in the present embodiment, the flexible circuit board 210 further includes a control element 213. The control element 213 is disposed on the second surface 210b of the flexible circuit board 210. For example, the control element 213 may be a micro control unit (MCU) or other similar devices. The control element 213 is configured to control the first light source assembly 220 and the second light source assembly 230 to emit light. The positioning member 240 is aligned with the control element 213 in a direction D2 perpendicular to the first surface 210a or the second surface 210b. In this way, the problem of soldering (e.g., non-wetting) when the control element 213 is mounted may be avoided, such that the yield of double-sided mounting by using surface mount technology (SMT) may be increased. In detail, before the control element 213 is mounted on the second surface 210b, other elements (such as the first light source assembly 220 and the second light source assembly 230) may have been mounted on the first surface 210a, so when the control element 213 is mounted on the second surface 210b, the back side thereof is not supported, which is prone to soldering problems (e.g., non-wetting). Therefore, the positioning member 240 provided on the back of the mounting position of the control element 213 may be used as a stress substrate for the control element 213 during mounting.

In some embodiments, a size of the control element 213 (e.g., the occupied area on the second surface 210b) is smaller than a size of the positioning member 240 (e.g., the occupied area on the first surface 210a), so when the control element 213 is mounted, it may completely fall within the range of the positioning member 240, so as to ensure that the control element 213 is fully supported when it is mounted. In other words, the orthographic projection of the control element 213 projecting onto the first surface 210a along the direction D2 will completely fall within the lateral range of the positioning member 240.

In some embodiments, a hardness of the positioning member 240 is greater than a hardness of the flexible circuit board 210, so as to increase the structural stability of the flexible circuit board 210.

As shown in FIG. 2, in the present embodiment, the positioning member 240 is arranged between the first light source assembly 220 and the second light source assembly 230 in a direction D1. In some embodiments, the positioning member 240 includes a light-blocking material. In this way, the positioning member 240 may achieve a light isolation effect between the first light source assembly 220 and the second light source assembly 230. In other words, the positioning member 240 may prevent the light emitted from the first single key light guide area Z1 from laterally reaching the keyswitch assembly 120 corresponding to the second single key light guide area Z2, and may prevent the light emitted from the second single key light guide area Z2 from laterally reaching the keyswitch assembly 120 corresponding to the first single key light guide area Z1.

Figure 3:
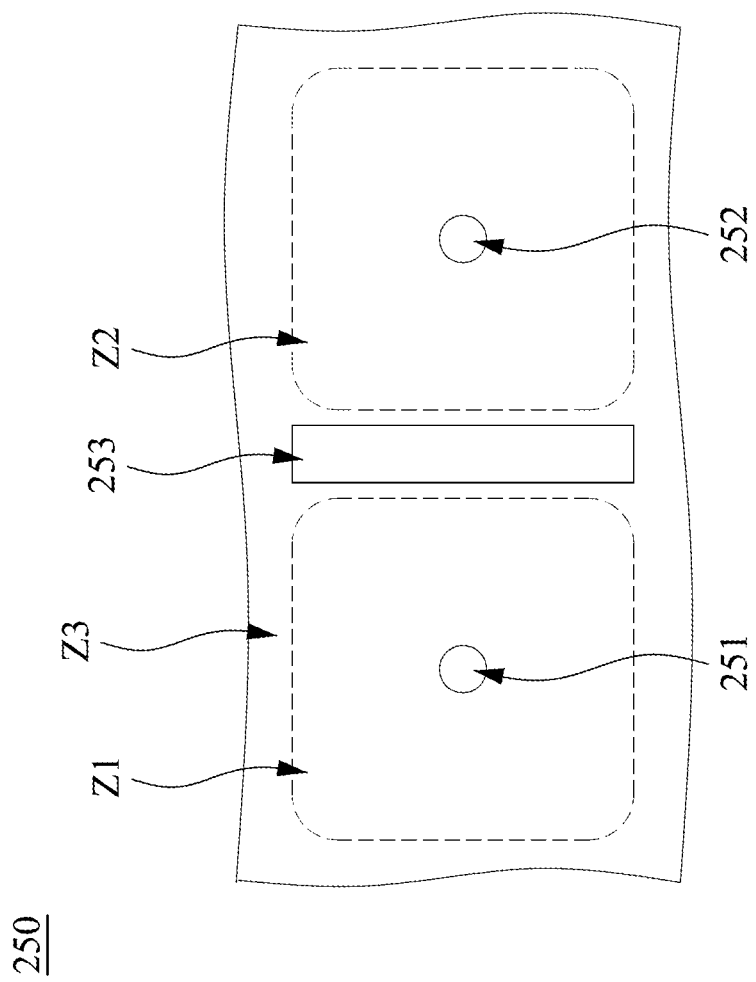
FIG. 3 is a partial top view of a light guide plate according to an embodiment of the disclosure.

Reference is made to FIG. 3. FIG. 3 is a partial top view of the light guide plate 250 according to an embodiment of the disclosure. As shown in FIG. 3, in the present embodiment, the first single key light guide area Z1 and the second single key light guide area Z2 (indicated by the dashed lines in the figure) are arranged in a horizontal direction (for example, the left-right direction), and the accommodating hole 253 is arranged between the first through hole 251 and the second through hole 252 in the horizontal direction. In other words, the accommodating hole 253 may be between the sides of the first single key light guide area Z1 and the second single key light guide area Z2. Therefore, the positioning member 240 provided in the accommodating hole 253 may isolate the light emitted by the first light source assembly 220 and the second light source assembly 230 respectively located in the first through hole 251 and the second through hole 252. In some embodiments, a contour of the accommodating hole 253 is rectangular as shown in FIG. 3, and the positioning member 240 has the same or similar contour, but the disclosure is not limited in this regard.

Figure 4:
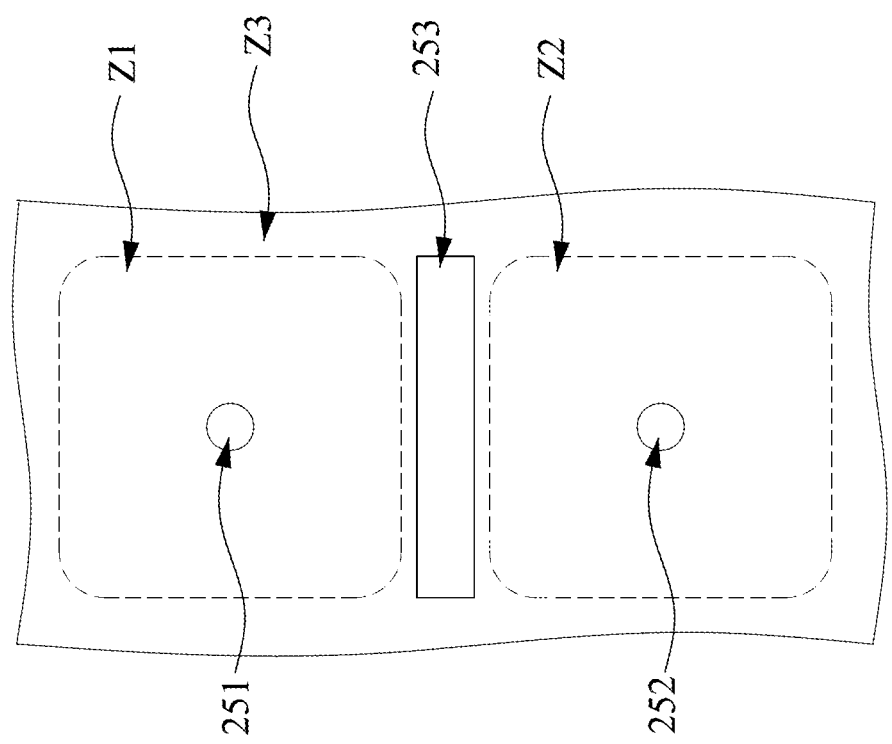
FIG. 4 is a partial top view of a light guide plate according to another embodiment of the disclosure.

Reference is made to FIG. 4. FIG. 4 is a partial top view of a light guide plate 250' according to another embodiment of the disclosure. As shown in FIG. 4, in the present embodiment, the first single key light guide area Z1 and the second single key light guide area Z2 (indicated by the dashed lines in the figure) are arranged in another horizontal direction (for example, the front-rear direction), and the accommodating hole 253 is arranged between the first through hole 251 and the second through hole 252 in the horizontal direction. In other words, the accommodating hole 253 may be between the sides of the first single key light guide area Z1 and the second single key light guide area Z2. Therefore, the positioning member 240 provided in the accommodating hole 253 may also isolate the light emitted by the first light source assembly 220 and the second light source assembly 230 respectively located in the first through hole 251 and the second through hole 252. In some embodiments, a contour of the accommodating hole 253 is rectangular as shown in FIG. 4, and the positioning member 240 has the same or similar contour, but the disclosure is not limited in this regard.

Figure 5:
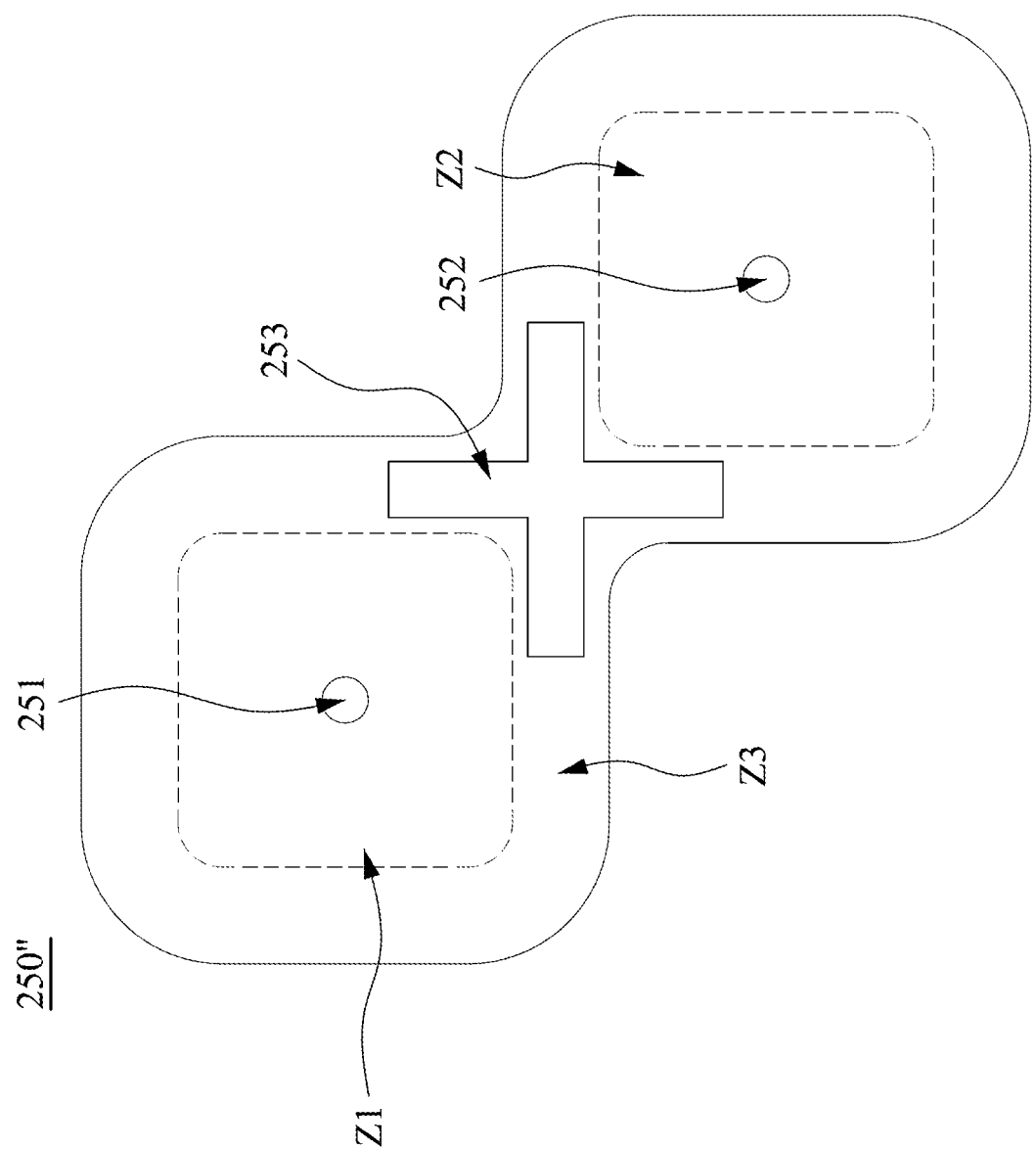
FIG. 5 is a partial top view of a light guide plate according to another embodiment of the disclosure.

Reference is made to FIG. 5. FIG. 5 is a partial top view of a light guide plate 250" according to another embodiment of the disclosure. As shown in FIG. 5, in the present embodiment, the first single key light guide area Z1 and the second single key light guide area Z2 (indicated by the dashed lines in the figure) are arranged in an oblique direction, and the accommodating hole 253 is arranged between the first through hole 251 and the second through hole 252 in the oblique direction. In other words, the accommodating hole 253 may be between the corners of the first single key light guide area Z1 and the second single key light guide area Z2. Therefore, the positioning member 240 provided in the accommodating hole 253 may also isolate the light emitted by the first light source assembly 220 and the second light source assembly 230 respectively located in the first through hole 251 and the second through hole 252. In some embodiments, a contour of the accommodating hole 253 is cross-shaped as shown in FIG. 5, and the positioning member 240 has the same or similar contour, but the disclosure is not limited in this regard.

As shown in FIG. 2, in the present embodiment, the backlight module 200 further includes a light-shielding plate 260. The light-shielding plate 260 is disposed over the light guide plate 250. The bottoms of the first single key light guide area Z1 and the second single key light guide area Z2 respectively include microstructure portions 254a, 254b. The microstructure portions 254a, 254b respectively surround the first light source assembly 220 and the second light source assembly 230 to respectively guide the light emitted by the first light source assembly 220 and the second light source assembly 230 to the light-shielding plate 260. In practical applications, two light-transmitting regions are provided on the light-shielding plate 260. The two light-transmitting regions respectively correspond to adjacent two of the keyswitch assemblies 120. Hence, the light emitted by the first light source assembly 220 and the second light source assembly 230 may be accurately irradiated to the adjacent two of the keyswitch assemblies 120 after passing through the two light-transmitting regions. For example, the areas of the two light-transmitting regions are respectively smaller than the areas of the first single key light-guiding area Z1 and the second single-key light-guiding area Z2, and are respectively aligned with the central areas of the keycaps of the two keyswitch assemblies 120, but the disclosure is not limited in this regard. In addition, the bottom of the connection area Z3 includes a microstructure portion 255. The microstructure portion 255 is located outside the first single key light guide area Z1 and the second single key light guide area Z2, and surrounds the first single key light guide area Z1 and the second single key light guide area Z2. The microstructure portion 255 may be located between the first light source assembly 220 and the positioning member 240 and between the second light source assembly 230 and the positioning member 240. The microstructure portion 255 corresponds to a shielding area of the light-shielding plate 260. After the light emitted by the first light source assembly 220 and the second light source assembly 230 propagates to the microstructure portion 255, it is guided upward to the shielding area of the light-shielding plate 260 and cannot be outputted. Moreover, since the light is guided upward, it will not continue to travel laterally, so that the light in the first single key light guide area Z1 and the light in the second single key light guide area Z2 may be prevented from interfering with each other.

As shown in FIG. 2, in the present embodiment, the backlight module 200 further includes a reflective layer 270. The reflective layer 270 is disposed between the light guide plate 250 and the flexible circuit board 210 and configured to reflect the light of the first light source assembly 220 and the second light source assembly 230 incident on the light guide plate 250 upward, thereby effectively reducing light loss. In addition, the positioning member 240 penetrates the reflective layer 270 and is accommodated in the accommodating hole 253. In this way, the thickness of the positioning member 240 may be increased, so the strength of the positioning member 240 may be increased, and the structural stability of the flexible circuit board 210 may be further increased.

As shown in FIG. 2, in the present embodiment, the flexible circuit board 210 includes a first circuit 211. The first circuit 211 is disposed on the first surface 210a and connected with the first light source assembly 220 and the second light source assembly 230. In addition, the positioning member 240 is disposed on a region of the first surface 210a of the flexible circuit board 210 that does not overlap the first circuit 211, so that the thickness of the positioning member 240 may be further increased.

As shown in FIG. 2, in the present embodiment, the flexible circuit board 210 further includes a second circuit 212. The second circuit 212 is disposed on the second surface 210b and electrically connected to the first circuit 211 and the control element 213. Hence, the control element 213 may individually control at least one of the light-emitting elements (e.g., a red light-emitting element, a green light-emitting element, or a green light-emitting element) in the first light source assembly 220 or the second light source assembly 230 to emit light via the first circuit 211 and the second circuit 212.

As shown in FIG. 2, in the present embodiment, a thickness of the positioning member 240 is greater than a thickness of the light guide plate 250 and is substantially equal to or smaller than a thickness sum of the light guide plate 250, the reflective layer 270, and the first circuit 211. In addition, in some embodiments without the reflective layer 270, a thickness of the positioning member 240 is greater than a thickness of the light guide plate 250 and is substantially equal to or smaller than a thickness sum of the light guide plate 250 and the first circuit 211. Hence, the thickness of the positioning member 240 on the flexible circuit board 210 may be maximized as much as possible.

According to the foregoing recitations of the embodiments of the disclosure, it may be seen that in the backlight module of the present disclosure, by disposing the positioning member on the flexible circuit board and forming the accommodating hole on the light guide plate to accommodate the positioning member, the convenience of assembling the backlight module is increased. In addition, the positioning member increases the structural stability of the flexible circuit board, thereby increasing the yield of double-sided mounting using SMT. By arranging the positioning member between the first light source assembly and the second light source assembly in one direction, the light isolation effect may be achieved between the first light source assembly and the second light source assembly. By making the positioning member penetrate the reflective layer disposed between the light guide plate and the flexible circuit board, the thickness of the positioning member may be increased, so as to increase the strength of the positioning member and further increase the structural stability of the flexible circuit board. By disposing the positioning member on a region of the first surface of the flexible circuit board that does not overlap the first circuit, the thickness of the positioning member may be further increased. By making the hardness of the positioning member greater than the hardness of the flexible circuit board, the structural stability of the flexible circuit board may be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
a flexible circuit board, wherein a first light source assembly, a second light source assembly, and a positioning member are disposed on the flexible circuit board;
a light guide plate disposed over the flexible circuit board and comprising:
a first single key light guide area having a first through hole accommodating the first light source assembly;
a second single key light guide area having a second through hole accommodating the second light source assembly; and
a connection area located between the first single key light guide area and the second single key light guide area and having an accommodating hole, wherein the flexible circuit board is overlapped with the light guide plate with the positioning member being accommodated in the accommodating hole[H]; and a light-shielding plate disposed over the light guide plate, wherein the connection area comprises a microstructure portion, and the microstructure portion is located between one of the first light source assembly and the second light source assembly and the positioning member, so as to guide light emitted by the one of the first light source assembly and the second light source assembly to a shielding area of the light-shielding plate.

2. The backlight module of claim 1, wherein the positioning member is arranged between the first light source assembly and the second light source assembly in a direction.

3. The backlight module of claim 1, further comprising a reflective layer disposed between the light guide plate and the flexible circuit board, wherein the positioning member penetrates the reflective layer and is accommodated in the accommodating hole.

4. The backlight module of claim 1, wherein the flexible circuit board has a first surface facing toward the light guide plate and comprises a first circuit, and the first circuit is disposed on the first surface and connected with the first light source assembly and the second light source assembly.

5. The backlight module of claim 4, wherein the flexible circuit board has a second surface facing away from the light guide plate and further comprises:

a second circuit disposed on the second surface and electrically connected to the first circuit; and a control element disposed on the second surface and connected to the second circuit.

6. The backlight module of claim 5, wherein the positioning member is disposed on the first surface and aligned with the control element in a direction perpendicular to the first surface or the second surface.

7. The backlight module of claim 4, wherein a thickness of the positioning member is greater than a thickness of the light guide plate and is substantially equal to or smaller than a thickness sum of the light guide plate and the first circuit.

8. The backlight module of claim 4, further comprising a reflective layer disposed between the light guide plate and the first circuit, wherein a thickness of the positioning member is greater than a thickness of the light guide plate and is substantially equal to or smaller than a thickness sum of the light guide plate, the reflective layer, and the first circuit.

9. The backlight module of claim 1, wherein a hardness of the positioning member is greater than a hardness of the flexible circuit board.

* * * * *